United States Patent
Akiyama et al.

(10) Patent No.: US 8,623,961 B2
(45) Date of Patent: Jan. 7, 2014

(54) OPTICAL ACRYLIC PRESSURE-SENSITIVE ADHESIVE COMPOSITION AND OPTICAL ACRYLIC PRESSURE-SENSITIVE ADHESIVE TAPE

(75) Inventors: Jun Akiyama, Osaka (JP); Masayuki Okamoto, Osaka (JP); Kiyoe Shigetomi, Osaka (JP); Masato Yamagata, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/352,823

(22) Filed: Jan. 18, 2012

(65) Prior Publication Data

US 2012/0184680 A1 Jul. 19, 2012

(30) Foreign Application Priority Data

Jan. 19, 2011 (JP) .................. 2011-009232

(51) Int. Cl.
*C08L 33/02* (2006.01)
*C08L 35/02* (2006.01)
*C08L 39/00* (2006.01)
*C08L 39/02* (2006.01)

(52) U.S. Cl.
USPC ............ 525/203; 525/217; 525/221; 525/222

(58) Field of Classification Search
USPC .................................. 525/203, 217, 221, 222
See application file for complete search history.

(56) References Cited

U.S. PATENT DOCUMENTS

| | | | |
|---|---|---|---|
| 5,695,837 A | 12/1997 | Everaerts et al. | |
| 2011/0236682 A1 | 9/2011 | Okamoto et al. | |
| 2013/0004769 A1* | 1/2013 | Okamoto et al. ...... | 428/355 CN |

FOREIGN PATENT DOCUMENTS

| | | | |
|---|---|---|---|
| JP | 6-207151 A | | 7/1994 |
| JP | 11-504054 A | | 4/1999 |
| JP | 2001-089731 | * | 4/2001 |
| JP | 2003-49128 A | | 2/2003 |
| JP | 2005-298724 A | | 10/2005 |
| WO | WO 2010/064623 A1 | | 6/2010 |
| WO | WO 2011/118183 A1 | | 9/2011 |

* cited by examiner

*Primary Examiner* — Nathan M Nutter
(74) *Attorney, Agent, or Firm* — Sughrue Mion, PLLC

(57) ABSTRACT

The present invention relates to an optical acrylic pressure-sensitive adhesive composition, containing: 100 parts by mass of an acrylic polymer (A) which contains a vinylic monomer having a nitrogen atom in a skeleton thereof as a monomer unit and does not substantially contain a monomer containing a carboxyl group; 1-70 parts by mass of a (meth) acrylic polymer (B) having a weight average molecular weight of 1,000 or greater and less than 30,000; and 1-50 parts by mass of a hydrogenated tackifying resin (C), and an optical acrylic pressure-sensitive adhesive tape including a pressure-sensitive adhesive layer containing the optical acrylic pressure-sensitive adhesive composition.

7 Claims, No Drawings

OPTICAL ACRYLIC PRESSURE-SENSITIVE ADHESIVE COMPOSITION AND OPTICAL ACRYLIC PRESSURE-SENSITIVE ADHESIVE TAPE

FIELD OF THE INVENTION

The present invention relates to an optical acrylic pressure-sensitive adhesive composition and an optical acrylic pressure-sensitive adhesive tape.

BACKGROUND OF THE INVENTION

In polarizing plates, which are assembled into display devices such as liquid crystal displays (LCD), and optical films, which are assembled into plasma displays (PDP), their outermost surfaces undergo a hard coat treatment to prevent damage, stains, etc., and as materials to be treated, materials with low surface energy or polarity are used. In addition, in PVA (polyvinyl alcohol) layer-protecting films that have recently been used in polarizing plates, triacetyl cellulose films have been replaced by norbornene resin films having low polarity.

For these reasons, in the case where optical films such as polarizing plates were pasted on display panels, conventional pressure-sensitive adhesive tapes had deficient adhesion reliability and caused problems in durability. As the usage of liquid crystal display devices becomes wider, they are used in various environments, and a high degree of adhesiveness, which does not cause peeling-off, is also in demand for pressure-sensitive adhesive tapes for pasting constitutional parts. In addition, high transparency is also required for the pressure-sensitive adhesive tapes so that the visibility of display panels is not lowered.

In Patent Documents 1 and 2, pressure-sensitive adhesive sheets (pressure-sensitive adhesive tapes) that are used for pasting optical members are presented. However, in pressure-sensitive adhesive compositions containing a lot of carboxyl groups, there has been a problem that adhesiveness becomes lowered with respect to an adherend having low polarity.

In addition, as a method for raising the adhesiveness to the adherend having low polarity, a method in which a tackifying resin (tackifier) is added to the pressure-sensitive adhesive compositions has been known. In Patent Documents 3 and 4, acrylic pressure-sensitive adhesive compositions, in which a rosin or hydrogenated tackifying resin is added as a tackifying resin to acrylic pressure-sensitive adhesive compositions, are presented. However, there still has been a case where the improvement of the adhesiveness to the adherend having low polarity could not be sufficiently achieved.

Patent Document 1: JP-A-2003-49128
Patent Document 2: JP-A-2005-298724
Patent Document 3: JP-A-6-207151
Patent Document 4: JP-T-11-504054

SUMMARY OF THE INVENTION

The present invention has been achieved in consideration of these problems, and an object of the invention is to provide an optical acrylic pressure-sensitive adhesive composition and an optical acrylic pressure-sensitive adhesive tape that have both high transparency and high adhesiveness and are used in pasting optical members and the like.

Namely, according to one embodiment, the present invention provides an optical acrylic pressure-sensitive adhesive composition, comprising:

100 parts by mass of an acrylic polymer (A) which contains a vinylic monomer having a nitrogen atom in a skeleton thereof as a monomer unit and does not substantially contain a monomer containing a carboxyl group;
1-70 parts by mass of a (meth)acrylic polymer (B) having a weight average molecular weight of 1,000 or greater and less than 30,000; and
1-50 parts by mass of a hydrogenated tackifying resin (C).

In accordance with the optical acrylic pressure-sensitive adhesive composition according to this embodiment, there can be provided an optical acrylic pressure-sensitive adhesive composition that has both high transparency and high adhesiveness and is used in pasting optical members and the like.

In one preferred embodiment, the acrylic polymer (A) may be a copolymer formed by copolymerizing, as essential components, the vinylic monomer and a (meth)acrylic acid ester represented by the following general formula (1):

$$CH_2=C(R^1)COOR^2 \qquad (1)$$

wherein $R^1$ represents a hydrogen atom or a methyl group, and $R^2$ represents an alkyl group having 1-12 carbon atoms or an alicyclic hydrocarbon group.

In another preferred embodiment, the vinylic monomer may be one kind or two or more kinds of monomers selected from the group consisting of a N-vinyl cyclic amide represented by the following general formula (2):

$$CH_2=CHNCOR^3 \qquad (2)$$

wherein $R^3$ represents a divalent organic group; and a (meth)acrylamide.

In still another preferred embodiment, the (meth)acrylic polymer (B) may have a glass transition temperature of 0-300° C.

In still another preferred embodiment, the (meth)acrylic polymer (B) may include a (meth)acrylic monomer having an alicyclic structure as a monomer unit.

In still another preferred embodiment, the hydrogenated tackifying resin (C) may be a petroleum-based resin or a terpene-based resin.

In still another preferred embodiment, the hydrogenated tackifying resin (C) may have a softening point of 80-200° C.

According to another embodiment, the present invention also provides an optical acrylic pressure-sensitive adhesive tape, which comprises a pressure-sensitive adhesive layer comprising the optical acrylic pressure-sensitive adhesive composition according to any one of the embodiments mentioned above.

According to the present invention, there can be provided an optical acrylic pressure-sensitive adhesive composition and an optical acrylic pressure-sensitive adhesive tape, which have both high transparency and high adhesion and are used in pasting optical members.

DETAILED DESCRIPTION OF THE INVENTION

An optical acrylic pressure-sensitive adhesive composition according to one embodiment of the invention contains 100 parts by mass of an acrylic polymer (A) which includes a vinylic monomer having a nitrogen atom in the skeleton as a monomer unit and does not substantially include a monomer containing a carboxyl group; 1-70 parts by mass of a (meth) acrylic polymer (B) having a weight average molecular weight of 1,000 or greater and less than 30,000; and 1-50 parts by mass of a hydrogenated tackifying resin (C).

(Acrylic Polymer (A))

The acrylic polymer (A) is a polymer that contains a vinylic monomer having a nitrogen atom in the skeleton thereof as a monomer unit and does not substantially contain a monomer containing a carboxyl group (carboxyl group-containing monomer). The optical acrylic pressure-sensitive adhesive composition according to this embodiment of the invention includes a vinylic monomer having a nitrogen atom in the skeleton as a monomer unit in the acrylic polymer (A), thereby rendering appropriate polarity to the acrylic pressure-sensitive adhesive composition. In addition, a monomer containing a carboxyl group is not substantially contained in the acrylic polymer (A), thereby preventing the polarity of the acrylic polymer (A) from being excessively raised. As a result, the affinity of the acrylic polymer (A) and the (meth)acrylic polymer (B) having low to intermediate polarity can be improved. Consequently, the adhesiveness of the optical acrylic pressure-sensitive adhesive tape to an adherend can be improved, and the transparency of the optical acrylic pressure-sensitive adhesive tape can be heightened.

Here, the aforementioned "monomer containing a carboxyl group (carboxyl group-containing monomer)" indicates a vinyl monomer (ethylenic unsaturated monomer) having at least one carboxyl group in one molecule (which can be a form of anhydride). As specific examples of the monomer containing a carboxyl group, ethylenic unsaturated monocarboxylic acids such as (meth)acrylic acid and crotonic acid; ethylenic unsaturated dicarboxylic acids such as maleic acid, itaconic acid, and citraconic acid; and anhydrides of ethylenic unsaturated dicarboxylic acids such as maleic anhydride and itaconic anhydride may be mentioned. In addition, the aforementioned term "not substantially contain (include)", for example, means that the acrylic polymer (A) does not contain a monomer containing a carboxyl group at all or the content of the monomer containing a carboxyl group is 0.1 mass % or less of all the monomer components. The aforementioned term "not substantially contain (include)", for example, means that the carboxyl group contained in the acrylic polymer (A) is 0.0014 mol/g equivalent or less.

In the acrylic polymer (A), preferably, not only is the monomer containing a carboxyl group not substantially contained, but monomers containing acidic groups (sulfonic acid groups, phosphoric acid groups, etc.) other than the carboxyl group are not substantially contained. In other words, preferably, a monomer containing a carboxyl group and other monomers containing acidic groups is not contained at all, or the total amount thereof is 0.1 mass % or less of all the monomer components, or the total amount of the carboxyl group and the other acid groups contained in the acrylic polymer (A) is 0.0014 mol/g equivalent or less.

In addition, the acrylic polymer (A), for example, may be a copolymer in which a vinylic monomer having a nitrogen atom in the skeleton thereof and a (meth)acrylic acid ester represented by the following general formula (1) have been copolymerized as essential components.

$$CH_2=C(R^1)COOR^2 \quad (1)$$

(In the formula (1), $R^1$ represents a hydrogen atom or a methyl group, and $R^2$ represents an alkyl group with 1-12 carbon atoms or an alicyclic hydrocarbon group.)

The acrylic polymer (A) can be obtained by polymerizing (for example, solution polymerization, emulsion polymerization, and UV polymerization) the vinylic monomer and the (meth)acrylic acid ester along with a polymerization initiator. Here, the aforementioned term "copolymerized as essential components" means that the total amount of the aforementioned vinylic monomer and the aforementioned (meth)acrylic acid ester is about 50 mass % or more of the total amount of monomer components constituting the acrylic polymer (A). The total amount of the aforementioned vinylic monomer and the aforementioned (meth)acrylic acid ester is for example about 50-100 mass %, preferably about 50-99.9 mass %, more preferably about 60-95 mass %, and still more preferably about 70-85 mass %.

Moreover, the aforementioned vinyl monomer is preferably one kind or two kinds or more of monomers selected from the group consisting of N-vinyl cyclic amides represented by the following general formula (2) and (meth)acrylamides.

$$CH_2=CHNCOR^3 \quad (2)$$

(In the formula (2), $R^3$ represents a divalent organic group.)

As detailed examples of the N-vinyl cyclic amide, N-vinyl-2-pyrrolidone, N-vinyl-2-piperidone, N-vinyl-3-morpholine, N-vinyl-2-caprolactam, N-vinyl-1,3-oxazine-2-one, N-vinyl-3,5-morpholinedione, etc., are mentioned.

As detailed examples of the (meth)acrylamides, (meth)acrylamide; N-alkyl (meth)acrylamide such as N-ethyl (meth)acrylamide, N-n-butyl (meth)acrylamide, N-isopropyl (meth)acrylamide, N-methylol (meth)acrylamide, N-methylolpropane (meth)acrylamide, N-methoxymethyl (meth)acrylamide, and N-butoxymethyl (meth)acrylamide; N-dialkyl (meth)acrylamide such as N—N-dimethyl (meth)acrylamide, N,N-diethyl (meth)acrylamide, N,N-dipropyl (meth)acrylamide, N,N-diisopropyl (meth)acrylamide, N,N-di(n-butyl) (meth)acrylamide, N,N-di(t-butyl) (meth)acrylamide; N-methylol (meth)acrylamide, N-ethylol (meth)acrylamide, etc., are mentioned. Here, these vinylic monomers can be used alone or in combination of two kinds or more thereof.

As vinylic monomers having a nitrogen atom in the skeleton other than the aforementioned monomers, succinimide-based monomers such as N-(meth)acryloyloxymethylenesuccinimide, N-(meth)acryloyl-6-oxyhexamethylenesuccinimide, N-(meth)acryloyl-8-oxyhexamethylenesuccinimide; maleimide-based monomers such as N-cyclohexylmaleimide, N-isopropylmaleimide, N-laurylmaleimide, and N-phenylmaleimide; itaconimide-based monomers such as N-methylitaconimide, N-ethylitaconimide, N-butylitaconimide, N-octylitaconimide, N-2-ethylhexylitaconimide, N-cyclohexylitaconimide, and N-laurylitaconimide; heterocyclic monomers containing nitrogen such as N-methylvinylpyrrolidone, N-vinylpyrazine, N-vinylimidazole, N-vinyloxazole, N-(meth)acryloylpiperidine, N-(meth)acryloylpyrrolidine, N-vinyl morpholine, N-vinylpyrazole, N-vinyl isoxazole, N-vinylthiazole, N-vinylisothiazole, N-vinylpyridazine, N-(meth)acrylolyl-2-pyrrolidone, N-vinylpyridine, N-vinylpyrimidine, N-vinylpiperazine, and N-vinylpyrrole; lactam-based monomers such as N-vinylcaprolactam; aminoalkyl (meth)acrylate-based monomers such as aminoethyl (meth)acrylate, N,N-dimethylaminoethyl (meth)acrylate, and t-butylaminoethyl (meth)acrylate; monomers containing an isocyanate group such as 2-isocyanate ethyl (meth)acrylate; acryloyl morpholine; N-vinylcarboxylate amides, etc., are mentioned.

As the aforementioned vinylic monomer, the N-vinyl cyclic amide represented by the aforementioned general formula (2) can be more appropriately used. In addition, $R^3$ of the aforementioned general formula (2) is preferably a saturated or unsaturated hydrocarbon group, more preferably a saturated hydrocarbon group (for example, an alkylene group having 3-5 carbon atoms). Especially preferably, as the N-vinyl cyclic amide, N-vinyl-2-pyrrolidone and N-vinyl-2-caprolactam are mentioned.

As detailed examples of the (meth)acrylic acid ester represented by the aforementioned general formula (1), alkyl (meth)acrylates ((meth)acrylic acid esters) such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate and dodecyl (meth)acrylate; (meth)acrylic acid esters having an alicyclic hydrocarbon group such as cyclopentyl (meth)acrylate, cyclohexyl (meth)acrylate and isobornyl (meth)acrylate; (meth)acrylic acid esters having an aromatic hydrocarbon group such as phenyl (meth)acrylate; (meth)acrylic acid esters obtained from terpene compound derivative alcohol, etc., can be used. These (meth)acrylic acid esters can be used alone or in combination thereof. In addition, the (meth)acrylic acid ester means acrylic acid ester and/or methacrylic acid ester, and all the terms "(meth)acryl", "(meth)acrylic", "(meth)acrylate" etc. herein indicate similar meanings.

Here, the acrylic polymer (A) may contain other monomer component(s) (copolymerizable monomer(s)) copolymerizable with the aforementioned vinylic monomer and (meth) acrylic acid ester, if necessary, to improve cohesive strength, heat resistance, crosslinking property, etc. In other words, the acrylic polymer (A) may include a copolymerizable monomer(s) along with the vinylic monomer and the (meth)acrylic acid ester as the main components.

As detailed examples of the copolymerizable monomer(s), vinyl esters such as vinyl acetate and vinyl propionate; acrylic monomers containing a hydroxyl group such as 2-hydroxyethyl (meth)acrylate, 4-hydroxybutyl (meth)acrylate, 3-hydroxypropyl (meth)acrylate and 6-hydroxyhexyl (meth)acrylate; cyanoacrylate monomers such as acrylonitrile and methacrylonitrile; alkoxyalkyl (meth)acrylate monomers such as methoxyethyl (meth)acrylate and ethoxyethyl (meth) acrylate; styrene-based monomers such as styrene and α-methylstyrene; acrylic monomers containing an epoxy group such as glycidyl (meth)acrylate; glycol-based acrylate monomers such as polyethylene glycol (meth)acrylate, polypropylene glycol (meth)acrylate, methoxyethylene glycol (meth) acrylate and methoxypropylene glycol (meth)acrylate; acrylate monomers having a heterocycle, halogen atom, silicon atom, etc., such as tetrahydrofurfuryl (meth)acrylate, (meth)acrylates containing a fluorine atom, and silicone (meth)acrylate; olefinic monomers such as isoprene, butadiene, and isobutylene; vinyl ether-based monomers such as methyl vinyl ether, ethyl vinyl ether; aromatic vinyl compounds such as vinyl toluene and styrene; olefins or dienes such as ethylene, butadiene, isoprene, and isobutylene; vinyl ethers such as vinyl alkyl ether; vinyl chloride, etc., are mentioned. Here, these copolymerizable monomers can be used alone or in combination of two kinds or more thereof.

Although the amount of the copolymerizable monomer used is not particularly limited, the copolymerizable monomers can be contained in a range of usually about 0.1-40 mass %, preferably about 0.5-30 mass %, and more preferably about 1-20 mass % to the total amount of monomer components for preparing the aforementioned acrylic polymer (A).

If the copolymerizable monomer is contained at about 0.1 mass % or more, decrease of the cohesive strength of the acrylic pressure-sensitive adhesive tape or sheet having an adhesive layer formed of the acrylic pressure-sensitive adhesive composition is prevented, thus enabling the achievement of a high shear strength. On the other hand, if the content of the copolymerizable monomer is about 40 mass % or less, excessive increase of the cohesive strength can be prevented, thus enabling the improvement of the tack at normal temperature (25° C.).

In addition, the acrylic polymer (A) may contain a polyfunctional monomer(s), if necessary, to adjust the cohesive strength of the acrylic pressure-sensitive adhesive composition.

As the polyfunctional monomer(s), for example, (poly) ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, 1,2-ethylene glycol di(meth)acrylate, 1,6-hexanediol di(meth)acrylate, 1,12-dodecanediol di(meth)acrylate, trimethylolpropane tri(meth) acrylate, tetramethylolmethane tri(meth)acrylate, allyl (meth)acrylate, vinyl (meth)acrylate, divinylbenzene, epoxy acrylate, polyester acrylate, urethane acrylate, butyl di(meth) acrylate, hexyl di(meth)acrylate, etc., are mentioned. Among them, trimethylolpropane tri(meth)acrylate, hexanediol di(meth)acrylate, and dipentaerythritol hexa(meth)acrylate can be appropriately used. The polyfunctional (meth)acrylates can be used alone or in combination of two kinds or more thereof.

Although the amount of the polyfunctional monomer used depends on the molecular weight, the number of functional groups, etc., the polyfunctional monomer may be added in a range of about 0.01-3.0 mass %, preferably about 0.02-2.0 mass %, and more preferably about 0.03-1.0 mass % to the total amount of monomer components for preparing the acrylic polymer (A).

If the amount of the polyfunctional monomer used exceeds about 3.0 mass % to the total amount of monomer components for preparing the acrylic polymer (A), for example, the cohesive strength of the acrylic pressure-sensitive adhesive composition may be too high, sometimes lowering the adhesive strength. On the other hand, if the amount is less than about 0.01 mass %, for example, the cohesive strength of the acrylic pressure-sensitive adhesive composition may be sometimes lowered.

<Polymerization Initiator>

In preparing the acrylic polymer (A), the acrylic polymer (A) can be easily formed by utilizing a curing reaction with heat or ultraviolet light using a polymerization initiator such as a thermal polymerization initiator or a photopolymerization initiator. In particular, a photopolymerization initiator can be appropriately used because of the advantage that the polymerization time can be shortened. The polymerization initiator can be used alone or in combination of two kinds or more thereof.

As the thermal polymerization initiator, for example, azo-based polymerization initiators (for example, 2,2'-azobisisobutyronitrile, 2,2'-azobis-2-methylbutyronitrile, 2,2'-azobis(2-methylpropionic acid)dimethyl, 4,4'-azobis-4-cyanovalerianic acid, azobisisovaleronitrile, 2,2'-azobis(2-amidinopropane) dihydrochloride, 2,2'-azobis[2-(5-methyl-2-imidazoline-2-yl)propane]dihydrochloride, 2,2'-azobis(2-methylpropionamidine)disulfate, and 2,2'-azobis(N,N'-dimethyleneisobutylamidine) dihydrochloride, etc.); peroxide-based polymerization initiators (for example, dibenzoyl peroxide, t-butyl permaleate, lauroyl peroxide, etc.); redox-based polymerization initiators, etc., are mentioned.

The amount the thermal polymerization initiator used is not particularly limited but may be in the utilizable range of conventional thermal polymerization initiators.

The photopolymerization initiator is not particularly limited. For example, benzoin ether-based photopolymerization initiators, acetophenone-based photopolymerization initiators, α-ketol-based photpolymerization initiators, aromatic sulfonyl chloride-based photopolymerization initiators, optically active oxime-based photopolymerization initiators, benzoin-based photopolymerization initiators, benzyl-based photopolymerization initiators, benzophenone-based photopolymerization initiators, ketal-based photopolymerization initiators, thioxanthone-based photopolymerization initiators, acylphosphine oxide-based photopolymerization initiators, etc., can be used.

Specifically, as the benzoin ether-based photopolymerization initiators, for example, benzoin methyl ether, benzoin ethyl ether, benzoin propyl ether, benzoin isopropyl ether, benzoin isobutyl ether, 2,2-dimethoxy-1,2-diphenylethane-1-one (trade name: Irgacure 651, made by Ciba Specialty Chemicals K.K.), anisole methyl ether, etc., are mentioned. As the acetophenone-based photopolymerization initiators, for example, 1-hydroxycyclohexylphenylketone (trade name: Irgacure 184, made by Ciba Specialty Chemicals K.K.), 4-phenoxydichloroacetophenone, 4-t-butyl-dichloroacetophenone, 1-[4-(2-hydroxyethoxy)-phenyl]-2-hydroxy-2-methyl-1-one (trade name: Irgacure 2959, made by Ciba Specialty Chemicals K.K.), 2-hydroxy-2-methyl-1-phenyl-propane-1-one (trade name: Darocure 1173, made by Ciba Specialty Chemicals K.K.), methoxyacetophenone, etc., are mentioned. As the α-ketol-based photopolymerization initiators, for example, 2-methyl-2-hydroxypropiophenone, 1-[4-(2-hydroxyethyl)-phenyl]-2-hydroxy-2-methylpropane-1-one, etc., are mentioned. As the aromatic sulfonyl chloride-based photopolymerization initiators, for example, 2-naphthalenesulfonyl chloride, etc., are mentioned. As the optically active oxime-based photopolymerization initiators, for example, 1-phenyl-1,1-propanedione-2-(o-ethoxycarbonyl)-oxime, etc., are mentioned.

In addition, among the benzoin-based photopolymerization initiators, for example, benzoin, etc. are included. Among the benzyl-based photopolymerization initiators, for example, benzyl, etc. are included. Among the benzophenone-based photopolymerization initiators, for example, benzophenone, benzoylbenzoic acid, 3,3'-dimethyl-4-methoxybenzophenone, polyvinyl benzophenone, a-hydroxycyclohexylphenylketone, etc., are included. Among the ketal-based photopolymerization initiators, for example, benzyl dimethyl ketal, etc., are included. Among the thioxanthone-based photopolymerization initiators, for example, thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, isopropylthioxanthone, 2,4-diisopropylthioxanthone, dodecylthioxanthone, etc., are included.

As the acylphosphine-based photopolymerization initiators, for example, bis(2,6-dimethoxybenzoyl)phenylphosphine oxide, bis(2,6-dimethoxybenzoyl)(2,4,4-trimethylpentyl)phosphine oxide, bis(2,6-dimethoxybenzoyl)-n-butylphosphine oxide, bis(2,6-dimethoxybenzoyl)-(2-methylpropane-1-yl)phosphine oxide, bis(2,6-dimethoxybenzoyl)-(1-methylpropane-1-yl)phosphine oxide, bis(2,6-dimethoxybenzoyl)-t-butylphosphine oxide, bis(2,6-dimethoxybenzoyl)cyclohexylphosphine oxide, bis (2,6-dimethoxybenzoyl)octylphosphine oxide, bis(2-methoxybenzoyl)(2-methylpropane-1-yl)phosphine oxide, bis(2-methoxybenzoyl)(1-methylpropane-1-yl)phosphine oxide, bis(2,6-diethoxybenzoyl)(2-methylpropane-1-yl)phosphine oxide, bis(2,6-diethoxybenzoyl)(1-methylpropane-1-yl) phosphine oxide, bis(2,6-dibutoxybenzoyl)(2-methylpropane-1-yl)phosphine oxide, bis(2,4-dimethoxybenzoyl)(2-methylpropane-1-yl)phosphine oxide, bis(2,4,6-trimethylbenzoyl)(2,4-dipentoxyphenyl)phosphine oxide, bis(2,6-dimethoxybenzoyl)benzylphosphine oxide, bis(2,6-dimethoxybenzoyl)-2-phenylpropylphosphine oxide, bis(2,6-dimethoxybenzoyl)-2-phenylethylphosphine oxide, bis(2,6-dimethoxybenzoyl)-2-phenylethylphosphine oxide, bis(2,6-dimethoxybenzoyl)benzyl phosphine oxide, bis(2,6-dimethoxybenzoyl)-2-phenylpropylphosphine oxide, bis(2,6-dimethoxybenzoyl)-2-phenylethylphosphine oxide, 2,6-dimethoxybenzoylbenzylbutylphosphine oxide, 2,6-dimethoxybenzoylbenzyloctylphosphine oxide, bis(2,4,6-trimethylbenzoyl)-2,5-diisopropylphenylphosphine oxide, bis(2,4,6-trimethylbenzoyl)-2-methylphenylphosphine oxide, bis(2,4,6-trimethylbenzoyl)-4-methylphenylphosphine oxide, bis(2,4,6-trimethylbenzoyl)-2,5-diethylphenylphosphine oxide, bis(2,4,6-trimethylbenzoyl)-2,3,5,6-tetramethylphenylphosphine oxide, bis(2,4,6-trimethylbenzoyl)-2,4-di-n-butoxyphenylphosphine oxide, 2,4,6-trimethylbenzoyldiphenylphosphine oxide, bis(2,6-dimethoxybenzoyl)-2,4,4-trimethylpentylphosphine oxide, bis(2,4,6-trimethylbenzoyl)isobutyl phosphine oxide, 2,6-dimethoxybenzoyl-2,4,6-trimethylbenzoyl-n-butylphosphine oxide, bis(2,4,6-trimethylbenzoyl)phenylphosphine oxide, bis(2,4,6-trimethylbenzoyl)-2,4-dibutoxyphenylphosphine oxide, 1,10-bis[bis(2,4,6-trimethylbenzoyl)phosphine oxide]decane, tri(2-methylbenzoyl)phosphine oxide, etc., are mentioned.

Although the amount of the photopolymerization initiator used is not particularly limited, for example, the amount is in a range of about 0.01-5 parts by mass, preferably about 0.05-3 parts by mass with respect to 100 parts by mass of the monomer components for preparing the acrylic polymer (A).

Here, if the amount of the photopolymerization initiator used is less than 0.01 parts by mass, the polymerization reaction is sometimes insufficient. If the amount of the photopolymerization initiator used exceeds about 5 parts by mass, the photopolymerization initiator absorbs ultraviolet light, so that the ultraviolet light does not reach the adhesive layer inside. In this case, the polymerization rate is lowered, or the molecular weight of the generating polymer is decreased. In addition, the cohesive strength of the pressure-sensitive adhesive layer to be formed is lowered, so that when the pressure-sensitive adhesive layer is peeled off from the film, part of the pressure-sensitive adhesive layer remains on the film, thereby preventing reuse of the film. Here, the photopolymerization initiator can be used alone or in combination of two kinds or more thereof.

To adjust the cohesive strength, a crosslinking agent can also be used in addition to the aforementioned polyfunctional monomer. As the crosslinking agent, an ordinary crosslinking agent can be used. For example, epoxy-based crosslinking agents, isocyanate-based crosslinking agents, silicone-based crosslinking agents, oxazoline-based crosslinking agents, aziridine-based crosslinking agents, silane-based crosslinking agents, alkyl etherified melamine-based crosslinking agents, metal chelate-based crosslinking agents, etc., can be used. In particular, the isocyanate-based crosslinking agents and the epoxy-based crosslinking agents can be appropriately used.

Specifically, as examples of the isocyanate-based crosslinking agents, tolylene diisocyanate, hexamethylene diisocyanate, isophorone diisocyanate, xylylene diisocyanate, hydrogenated xylylene diisocyanate, diphenylmethane diisocyanate, hydrogenated diphenylmethane diisocyanate, tetramethylxylylene diisocyanate, naphthaline diisocyanate, triphenylmethane triisocyanate, polymethylene polyphenyl isocyanate, and adducts of these compounds and polyol such as trimethylolpropane can be mentioned.

As the epoxy-based crosslinking agents, biphenol A, epichloropyridine type epoxy group resin, ethylene glycidyl ether, polyethylene glycol diglycidyl ether, glycerol diglycidyl ether, glycerol triglycidyl ether, 1,6-hexanediol glycidyl ether, trimethylolpropane triglycidyl ether, diglycidyl aniline, diamine glycidyl amine, N,N,N',N'-tetraglycidyl-m-xylylenediamine, 1,3-bis(N,N'-diamine glycidyl aminomethyl)cyclohexane, etc., can be mentioned.

In this embodiment of the present invention, the acrylic polymer (A) can also be prepared as a partially polymerized product (acrylic polymer syrup) in which the monomer components have been partially polymerized by irradiating ultraviolet light (UV) to a mixture containing the aforementioned monomer components and the polymerization initiator. The acrylic polymer syrup may be mixed with the (meth)acrylic polymer (B), which will be mentioned later, to prepare an acrylic pressure-sensitive adhesive composition, and this pressure-sensitive adhesive composition is spread on a prescribed object and then subjected to irradiation with ultraviolet light, thus enabling completion of the polymerization. In addition, the weight average molecular weight (Mw) of the acrylic polymer (A), for example, is 30,000-5,000,000. Herein, the method for determining the weight average molecular weight of the acrylic polymer (A) is the same as that for determining the weight average molecular weight of the (meth)acrylic polymer (B) described later.

Here, the glass transition temperature (Tg) of the acrylic polymer (A) is preferably lower than 0° C., more preferably lower than −10° C., and usually −80° C. or higher. Herein, the method for determining the glass transition temperature of the acrylic polymer (A) is the same as that for determining the glass transition temperature of the (meth)acrylic polymer (B) described later.

((Meth)Acrylic Polymer (B))

The (meth)acrylic polymer (B) is a polymer which has a weight average molecular weight lower than that of the acrylic polymer (A). The (meth)acrylic polymer (B) functions as a tackifying resin, and it hardly inhibit the polymerization during the UV polymerization. The (meth)acrylic polymer (B), for example, includes a (meth)acrylic acid ester as a monomer unit.

As examples of the (meth)acrylic acid ester, alkyl (meth)acrylates such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, 2-ethylhexyl (meth)acrylate, heptyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, and dodecyl (meth)acrylate; esters of (meth)acrylic acid such as cyclohexyl (meth)acrylate and isobornyl (meth)acrylate with alicyclic alcohol; aryl (meth)acrylates such as phenyl (meth)acrylate and benzyl (meth)acrylate; (meth)acrylic acid ester that is obtained from terpene compound derivative alcohol, etc., can be mentioned. These (meth)acrylic acid esters can be used alone or in combination of two kinds or more thereof.

In addition, the (meth)acrylic polymer (B) can also be obtained by copolymerizing other monomer component(s) (copolymerizable monomer(s)) copolymerizable with the (meth)acrylic acid ester in addition to the aforementioned (meth)acrylic acid ester component unit.

As the other monomers copolymerizable with the (meth)acrylic acid ester, alkoxyalkyl (meth)acrylate monomers such as methoxyethyl (meth)acrylate, ethoxyethyl (meth)acrylate, propoxyethyl (meth)acrylate, butoxyethyl (meth)acrylate, and ethoxypropyl (meth)acrylate; salts such as alkali metal (meth)acrylate salts; di(meth)acrylic acid ester monomers of (poly)alkylene glycol such as di(meth)acrylic acid ester of ethylene glycol, di(meth)acrylic acid ester of diethylene glycol, di(meth)acrylic acid ester of triethylene glycol, di(meth)acrylic acid ester of polyethylene glycol, di(meth)acrylic acid ester of propylene glycol, di(meth)acrylic acid ester of dipropylene glycol, and di(meth)acrylic acid ester of tripropylene glycol; polyvalent (meth)acrylic acid ester monomers such as trimethylolpropane tri(meth)acrylate; vinyl esters such as vinyl acetate and vinyl propionate; vinyl halide compounds such as vinylidene chloride and 2-chloroethyl (meth)acrylate; polymerizable compounds containing an oxazoline group such as 2-vinyl-2-oxazoline, 2-vinyl-5-methyl-2-oxazoline, 2-isopropenyl-2-oxazoline; polymerizable compounds containing an aziridine group such as (meth)acryloylaziridine, and (meth)acrylic acid-2-aziridinine ethyl; vinyl monomers containing an epoxy group such as allyl glycidyl ether, glycidyl (meth)acrylate, 2-ethyl glycidyl (meth)acrylate; vinyl monomers containing a hydroxyl group such as 2-hydroxyethyl (meth)acrylate, 2-hydroxypropyl (meth)acrylate, monoester of (meth)acrylic acid and polypropylene glycol or polyethylene glycol, and adducts of lactones and 2-hydroxyethyl (meth)acrylate; vinyl monomers containing fluorine such as fluorine-substituted alkyl (meth)acrylate; monomers containing an acid anhydride group such as maleic anhydride and itaconic anhydride; aromatic vinyl compound-based monomers such as styrene, α-methylstyrene and vinyltoluene; vinyl monomers containing reactive halogen such as 2-chloroethylvinyl ether and vinyl monochloroacetate; vinyl monomers containing an amide group such as (meth)acrylamide, N-isopropyl (meth)acrylamide, N-butyl (meth)acrylamide, N,N-diethyl (meth)acrylamide, N,N-dimethyl (meth)acrylamide, N-methylol (meth)acrylamide, N-ethylol (meth)acrylamide, N-methylolpropane (meth)acrylamide, N-methoxyethyl (meth)acrylamide, N-butoxymethyl (meth)acrylamide and N-acryloylmorpholine; succinimide-based monomers such as N-(meth)acryloyloxymethylenesucinimide, N-(meth)acryloyl-6-oxyhexamethylenesuccinimide and N-(meth)acryloyl-8-oxyhexamethylenesuccinimide; maleimide-based monomers such as N-cyclohexylmaleimide, N-isopropylmaleimide, N-laurylmaleimide and N-phenylmaleimide; itaconimide-based monomers such as N-methylitaconimide, N-ethylitaconimide, N-butylitaconimide, N-octylitaconimide, N-2-ethylhexylitaconimide, N-cyclohexylitaconimide and N-laurylitaconimide; heterocyclic monomers containing nitrogen such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine, N-vinylmorpholine, N-vinylpyrazole, N-vinylisoxazole, N-vinylthiazole, N-vinylisothiazole and N-vinylpyridazine; N-vinylcarboxylic acid amides; lactam-based monomers such as N-vinylcaprolactam; cyanoacrylate monomers such as (meth)acrylonitrile; aminoalkyl (meth)acrylate-based monomers such as aminoethyl (meth)acrylate, N,N-dimethylaminoethyl (meth)acrylate, N,N-dimethylaminoethyl (meth)acrylate and t-butylaminoethyl (meth)acrylate; monomers containing an imide group such as cyclohexylmaleimide and isopropylmaleimide; monomers containing an isocyanate group such as 2-isocyanate ethyl (meth)acrylate; vinyl monomers containing organosilicon such as vinyl trimethoxysilane, γ-methacryloxypropyl trimethoxysilane, allyl trimethoxysilane, trimethoxysilylpropylallylamine, 2-methoxyethoxy trimethoxysilane; monomers containing a hydroxyl group, for example, hydroxyalkyl (meth)acrylate such as hydroxyethyl (meth)acrylate, hydroxypropyl (meth)acrylate, hydroxybutyl (meth)acrylate, hydroxyhexyl (meth)acrylate, hydroxyoctyl (meth)acrylate, hydroxydecyl (meth)acrylate, hydroxylauryl (meth)acrylate, and (4-hydroxymethylcyclohexyl)methyl methacrylate; acrylic ester-based monomers having a heterocycle, halogen atom, fluorine atom, etc., such as tetrahydrofurfuryl (meth)acrylate, (meth)acrylates containing a fluorine atom, and silicone (meth)acrylate; olefinic monomers such as isoprene, butadiene and isobutylene; vinyl ether-based monomers such as methyl vinyl ether and ethyl vinyl ether; olefins or dienes such as ethylene, butadiene, isoprene, and isobutylene; vinyl ethers such as vinyl alkyl ether; vinyl chloride; and other macromonomers having a radical polymerizable vinyl group at a monomer terminal polymerized with a vinyl group can be mentioned. These monomer can be copolymerized with the aforementioned (meth)acrylic acid ester alone or in combination.

In the acrylic pressure-sensitive adhesive composition in this embodiment of the present invention, as the (meth)acrylic polymer (B), for example, copolymer of cyclohexyl methacrylate (CHMA) and isobutyl methacrylate (IBMA), copolymer of cyclohexyl methacrylate (CHMA) and isobornyl methacrylate (IBXMA), copolymer of cyclohexyl methacrylate (CHMA) and acryloylmorpholine (ACMO), copolymer of cyclohexyl methacrylate (CHMA) and diethylacrylamide (DEAA), copolymer of 1-adamantyl methacrylate (ADMA) and methyl methacrylate (MMA), copolymer of dicyclopentanyl methacrylate (DCPMA) and methyl methacrylate (MMA), copolymer of isobornyl methacrylate (IBXMA) and methyl methacrylate (MMA), each homopolymer of dicylopentanyl methacrylate (DCPMA), dicyclopentanyl acrylate (DCPA), cyclohexyl methacrylate (CHMA), isobornyl methacrylate (IBXMA), and isobornyl acrylate (IBXA), etc., can be mentioned.

In addition, in the (meth)acrylic polymer (B), acrylic monomers having a relatively bulky structure, which are represented by (meth)acrylates having an alkyl group with a branch structure such as t-butyl (meth)acrylate, esters of (meth)acrylic acid with alicyclic alcohol, such as cyclohexyl (meth)acrylate and isobornyl (meth)acrylate, and aryl (meth)acrylates such as phenyl (meth)acrylate and benzyl (meth)acrylate, etc., are preferably contained as a monomer unit. By rendering this bulky structure to the (meth)acrylic polymer (B), the adhesiveness of the acrylic pressure-sensitive adhesive composition can be further improved. In particular, the adhesiveness to an adherend with low polarity can be more markedly improved. Moreover, where UV polymerization is adopted for the synthesis of the (meth)acrylic polymer (B), the (meth)acrylate having an alkyl group with a branch structure or the ester of (meth)acylic acid with alicyclic alcohol can be appropriately used as a monomer constituting the (meth)acrylic polymer (B) in terms that it hardly inhibit the polymerization.

Furthermore, a functional group having reactivity with an epoxy group or isocyanate group may be introduced into the (meth)acrylic polymer (B). As examples of such functional group, hydroxyl group, carboxyl group, amino group, amide group, and mercapto group can be mentioned, and a monomer containing such functional group is preferably used in preparing the (meth)acrylic polymer (B).

The weight average molecular weight of the (meth)acrylic polymer (B) is 1,000 or greater and less than 30,000, preferably 1,500 or greater and less than 20,000, and more preferably 2,000 or greater and less than 10,000. If the weight average molecular weight thereof is 30,000 or greater, sufficient improvement effect on the adhesive strength in the pressure-sensitive adhesive tape cannot sometimes be obtained. On the other hand, if the weight average molecular weight thereof is less than 1,000, since the molecular weight is low, the adhesive strength and the adhesion property of the pressure-sensitive adhesive tape may sometimes be decreased.

The weight average molecular weight can be measured in terms of polystyrene (polystyrene conversion) in accordance with GPC method. Specifically, the weight average molecular weight is measured with the HPLC8020 made by Tosoh Corporation under the conditions of a flow velocity of tetrahydrofuran solvent of about 0.5 mL/min, and using 2 pieces of TSKgel GMH-H (20) as columns.

The content of the (meth)acrylic polymer (B) is 1-70 parts by mass, preferably 3-60 parts by mass, and more preferably 5-50 parts by mass with respect to 100 parts by mass of the acrylic polymer (A). If the (meth)acrylic polymer (B) is added at more than 70 parts by mass, the elastic modulus of the pressure-sensitive adhesive layer formed of the acrylic pressure-sensitive adhesive composition in this embodiment is raised, sometimes impairing the adhesive performance at low temperature or not exerting an adhesive strength even at room temperature. On the other hand, if the amount to be added is less than 1 part by mass, the effect cannot sometimes be obtained.

The (meth)acrylic polymer (B) preferably has a glass transition temperature (Tg) of about 0-300° C., more preferably about 20-300° C., and further preferably about 20-200° C. If the glass transition temperature (Tg) is lower than about 0° C., the cohesive strength of the pressure-sensitive adhesive layer at room temperature or higher is lowered, and the adhesion performance at high-temperature is sometime lowered. In this embodiment, the glass transition temperatures of representative materials usable as the (meth)acrylic polymer (B) are shown in Table 1. The glass transition temperatures of the (meth)acrylic polymer (B) are nominal values described in publications, catalogues, etc., or values calculated based on the following equation (3) (Fox equation).

$$1/Tg = W1/Tg1 + W2/Tg2 + \cdots + Wn/Tgn \qquad (3)$$

(In the equation (3), Tg represents the glass transition temperature (unit: K) of the (meth)acrylic polymer (B), Tgi (i=1, 2, . . . , and n) represents the glass transition temperature (unit: K) when a monomer i forms a homopolymer, and Wi (i=1, 2, . . . , and n) represents the mass fraction of the monomer i in the whole monomer components.)

The aforementioned equation (3) is the calculation expression in the case where the (meth)acrylic polymer (B) is composed of n kinds of monomer components of monomer 1, monomer 2, . . . , and monomer n.

TABLE 1

| Composition of (meth)acrylic polymer (B) | Tg (°C.) | Remarks |
| --- | --- | --- |
| CHMA | 66 | Value described in publications |
| CHA | 15 | Value described in publications |
| IBXMA | 173 | Value described in publications |
| IBXA | 97 | Value described in publications |
| DCPMA | 175 | Value described in publications |
| DCPA | 120 | Value described in publications |
| IBMA | 48 | Value described in publications |
| CHMA/IBMA = 60/40 | 59 | Calculated value (based on the Fox equation) |

The abbreviations in Table 1 indicate the following compounds.

CHMA: cyclohexyl methacrylate
CHA: cyclohexyl acrylate
IBXMA: isobornyl methacrylate
IBXA: isobornyl acrylate
DCPMA: dicyclopentanyl methacrylate
DCPA: dicyclopentanyl acrylate
IBMA: isobutyl methacrylate
CHMA/IBMA=60/40: copolymer of 60 parts by mass of CHMA and 40 parts by mass of IBMA Preferable examples of the (meth)acrylic polymer (B) explained above are summarized as follows.

(1) The glass transition temperature of the (meth)acrylic polymer (B) is preferably 0-300° C.

(2) The (meth)acrylic polymer (B) preferably contains a (meth)acrylic monomer having an alicyclic structure, such as cyclohexyl (meth)acrylate, isobornyl (meth)acrylate, and dicyclopentanyl (meth)acrylate, as a monomer unit.

<Method for Preparing the (Meth)Acrylic Polymer (B)>

The (meth)acrylic polymer (B), for example, can be prepared by polymerizing the (meth)acrylic monomer having the aforementioned structure according to a solution polymerization method, bulk polymerization method, emulsion polymerization method, suspension polymerization, bulk polymerization, etc.

<Method for Adjusting the Molecular Weight of the (Meth) Acrylic Polymer (B)>

To adjust the molecular weight of the (meth)acrylic polymer (B), a chain transfer agent can be used during its polymerization. As examples of the chain transfer agent for use, compounds having a mercapto group such as octylmercaptan, cyclohexylmercaptan, dodecylmercaptan, t-dodecylmercaptan, and mercaptoethanol; and thioglycerol, thioglycolic acid, methyl thioglycolate, ethyl thioglycolate, propyl thioglycolate, butyl thioglycolate, t-butyl thioglycolate, 2-ethylhexyl thioglycolate, octyl thioglycolate, isooctyl thioglycolate, decyl thioglycolate, dodecyl thioglycolate, thioglycolic acid ester of ethylene glycol, thioglycolic acid ester of neopentyl glycol, and thioglycolic acid ester of pentaerythritol are mentioned.

Although the amount of the chain transfer agent used is not particularly limited, the chain transfer agent is included in a range of usually about 0.1-20 parts by mass, preferably about 0.2-15 parts by mass, and more preferably about 0.3-10 parts by mass with respect to 100 parts by mass of the (meth)acrylic monomer. With this adjustment of the amount of addition of the chain transfer agent, the (meth)acrylic polymer (B) with an appropriate molecular weight can be obtained. Here, the chain transfer agents can be used alone or in combination of two kinds or more thereof.

(Hydrogenated Tackifying Resin (C))

The hydrogenated tackifying resin (C) is a resin other than rosin-based resins. Specifically, it can be selected from derivatives hydrogenated into tackifying resins such as petroleum-based resins, terpene-based resins, chroman-indene-based resins, styrene-based resins, alkyl phenol resins, and xylene resins. For example, the hydrogenated petroleum-based resin can be selected from aromatic ones, dicyclopentadiene-based ones, aliphatic ones, aromatic monomer-dicyclopentadiene copolymerized-type ones, etc. In addition, the hydrogenated terpene-based resin can be selected from terpene phenol resins, aromatic terpene resins, etc. Among them, a hydrogenated petroleum-based resin and a hydrogenated terpene-based resin are especially preferably used.

The softening point of the hydrogenated tackifying resin (C) is preferably 80-200° C., more preferably 100-200° C. By setting the softening point of the hydrogenated tackifying resin (C) to such a range, a high cohesive strength can be obtained.

As mentioned above, the content of the hydrogenated tackifying resin (C) is 1-50 parts by mass, preferably 2-40 parts by mass, and more preferably 3-30 parts by mass with respect to 100 parts by mass of the acrylic polymer (A). If the amount of addition of the hydrogenated tackifying resin (C) is more than 50 parts by mass, the transparency or cohesive strength is sometimes lowered. On the other hand, if the amount of addition of the hydrogenated tackifying resin (C) is less than 1 part by mass, sometimes the improvement effect on the adhesive strength cannot be obtained.

The mixture amounts of the (meth)acrylic polymer (B) (oligomer) and the hydrogenated tackifying resin (C) are such that the ratio (meth)acrylic polymer (B)/hydrogenated tackifying resin (C) is 1.0/0.1-2.0, preferably 1.0/0.2-1.5, and more preferably 1.0/0.3-1.0 (all of these are the mass ratio). If the amount of mixture of both of these components is within this range, the transparency and the adhesion reliability are improved. The reason for this is presumed to be that the (meth)acrylic polymer (B) acts as a compatibilizer of the hydrogenated tackifying resin and both of them are uniformly dispersed, thereby improving the transparency and the adhesion reliability.

The acrylic pressure-sensitive adhesive composition of this embodiment includes the aforementioned acrylic polymer (A), (meth)acrylic polymer (B), and hydrogenated tackifying resin (C) as its essential components and can include various kinds of general additives in the field of pressure-sensitive adhesive compositions as optional component(s). As these optional components, plasticizers, softening agents, fillers, colorants (pigments, dyes, etc.), antioxidants, leveling agents, stabilizers, antiseptics, etc., are mentioned. As these additives, conventional well-known additives can be used according to ordinary methods.

Next, the structure of the optical acrylic pressure-sensitive adhesive tape (or optical acrylic pressure-sensitive adhesive sheet) including a pressure-sensitive adhesive layer containing the optical acrylic pressure-sensitive adhesive composition with the aforementioned composition will be explained.

The optical acrylic pressure-sensitive adhesive tape in this embodiment is provided with a pressure-sensitive adhesive layer containing the optical acrylic pressure-sensitive adhesive composition. The optical acrylic pressure-sensitive adhesive tape may be a so-called pressure-sensitive adhesive tape with a substrate, in which a pressure-sensitive adhesive layer is fixed on one surface or both surfaces of a sheet-shaped substrate (support), that is, without intending the pressure-sensitive adhesive layer to separate from the substrate, or a so-called pressure-sensitive adhesive tape without a substrate, in which the pressure-sensitive adhesive layer is provided on a substrate with a peel-off property such as a peel-off liner (peel-off paper, resin sheet whose surface has been subjected to a peel-off treatment, etc.) and the substrate for supporting the pressure-sensitive adhesive layer is removed at the time of pasting. Here, the concept of the pressure-sensitive adhesive tape can include pressure-sensitive adhesive sheets, pressure-sensitive adhesive labels, pressure-sensitive adhesive films, etc. In addition, the pressure-sensitive adhesive layer is not limited to a continuously formed pressure-sensitive adhesive layer but may be a pressure-sensitive adhesive layer formed with a regular or random pattern such as a dotted shape and stripe shape.

As the aforementioned substrate, for example, plastic film, for example, polyester film such as polypropylene film, ethylene-propylene copolymer film, polyethylene terephthalate film, and polyethylene naphthalate film, and polyvinyl chloride film; foam substrate such as polyurethane foam and polyethylene foam; paper such as kraft paper, crepe paper, and Japanese paper; cloth such as cotton cloth and spun rayon; nonwoven fabric such as nonwoven polyester fabric and nonwoven vinylon fabric; metal foil such as aluminum foil and copper foil; and the like can be appropriately selected and used according to the applications of the pressure-sensitive adhesive tape. As the aforementioned plastic film, any of the unstretched films and stretched (uniaxially stretched or biaxially stretched) films can be used. In addition, the surface of the substrate on which the pressure-sensitive adhesive layer is to be provided may be subjected to a surface treatment such as spreading of an undercoat agent and corona discharge treatment. The thickness of the substrate can be appropriately selected in accordance with the purpose and is generally about 10-500 (typically, 10-200 µm).

The pressure-sensitive adhesive layer can be a cured layer of the optical acrylic pressure-sensitive adhesive composition. In other words, the pressure-sensitive adhesive layer can be formed by appropriately applying a curing treatment after rendering (for example, spreading) the optical acrylic pressure-sensitive adhesive composition onto an appropriate substrate. In the case where two or more kinds of curing treatments (drying, crosslinking, polymerizing, etc.) are carried out, these treatments can be carried out simultaneously or inmultiple steps. With the pressure-sensitive adhesive composition using a partially polymerized product (acrylic polymer syrup), the final copolymerization reaction is typically carried out as the aforementioned curing treatment (the partially polymerized product is subjected to a further copolymerization reaction to form a completely polymerized product). For example, for a photocurable pressure-sensitive adhesive composition, it is irradiated with light. If necessary, a curing treatment such as crosslinking and drying may also be applied. For example, in the case where the photocurable pressure-sensitive adhesive composition is required to be dried, photocuring may be carried out after drying. For the pressure-sensitive adhesive composition using the completely polymerized product, as the aforementioned curing treatment, treatments such as drying (heating drying) and crosslinking are typically carried out, if necessary.

In spreading the optical acrylic pressure-sensitive adhesive composition, for example, common coaters such as gravure roll coaters, reverse roll coaters, kiss roll coaters, dip roll coaters, bar coater, knife coaters and spray coaters can be employed. Here, for the pressure-sensitive adhesive tape with a substrate, the pressure-sensitive adhesive layer may be formed by directly rendering the pressure-sensitive adhesive composition onto the substrate, or the pressure-sensitive adhesive layer formed on a peel-off liner may be transferred to the substrate.

Although the thickness of the pressure-sensitive adhesive layer is not particularly limited, for example, when the thickness is usually about 10 µm or greater, preferably about 15 µm or greater, and more preferably about 20 µm or greater, a good adhesive performance can be realized. For example, the thickness of the pressure-sensitive adhesive layer is appropriately about 10-250 µm.

The optical acrylic pressure-sensitive adhesive tape in this embodiment is appropriately used in the application, for example, of pasting of various kinds of display panel members such as polarizing plates whose outermost surface has undergone a hard coat treatment and glass substrates. As the method for forming the pressure-sensitive adhesive layer on various kinds of members, a direct rendering method or transfer method can be appropriately employed. Typically, the pressure-sensitive adhesive layer formed on the peel-off liner is transferred to the base surface of the members.

As explained above, the optical acrylic pressure-sensitive adhesive composition in this embodiment contains 100 parts by mass of an acrylic polymer (A) which contains a vinylic monomer having a nitrogen atom in the skeleton as a monomer unit and does not substantially contain a monomer containing a carboxyl group; 1-70 parts by mass of a (meth)acrylic polymer (B) with a weight average molecular weight of 1,000 or greater and less than 30,000; and 1-50 parts by mass of a hydrogenated tackifying resin (C). In this way, high transparency and high adhesion can be provided to the optical acrylic pressure-sensitive adhesive composition.

The reason why the adhesiveness of the acrylic pressure-sensitive adhesive tape to an adherend with low polarity is improved is presumed to be that the (meth)acrylic polymer (B) is compatible with the hydrogenated tackifying resin (C) and also compatible with the acrylic polymer (A). In other words, the reason for this is presumed to be that the (meth)acrylic polymer (B) acts a compatibilizer of the hydrogenated tackifying resin (C), so that both of them are uniformly dispersed, thereby improving the adhesion reliability.

Especially in the case where the (meth)acrylic polymer (B) has an alicyclic structure, it is presumed that the compatibility with the hydrogenated tackifying resin (C) is raised by the alicyclic structure, while the main chain of the (meth)acrylic polymer (B) is compatible with the acrylic polymer (A).

EXAMPLES

Next, the present invention will be explained in detail based on examples; however the present invention is not at all limited to these examples.

Components of optical acrylic pressure-sensitive adhesive compositions of Examples 1-4 and Comparative Examples 1-6 are shown in Table 2.

TABLE 2

| | Acrylic polymer (A) | | (Meth)acrylic polymer (B) | | | | Hydrogenated tackifying resin (C) | | Crosslinking agent (TMPTA) | Solvent-insoluble component |
|---|---|---|---|---|---|---|---|---|---|---|
| | Composition | Number of parts | Composition | Molecular weight | Tg (° C.) | Number of parts | Type | Softening point (° C.) | Number of parts | Number of parts | ratio [Mass %] |
| Example 1 | 2EHA/NVP = 86/14 | 100 | CHMA/ IBMA = 60/40 | 4,000 | 59 | 20 | ARCON P125 | 125 | 5 | 0.2 | 71.3 |
| Example 2 | 2EHA/NVP = 86/14 | 100 | CHMA/ IBMA = 60/40 | 4,000 | 59 | 12 | ARCON P125 | 125 | 8 | 0.15 | 71.9 |

TABLE 2-continued

|  | Acrylic polymer (A) | | (Meth)acrylic polymer (B) | | | | Hydrogenated tackifying resin (C) | | Crosslinking agent (TMPTA) | Solvent-insoluble component |
| --- | --- | --- | --- | --- | --- | --- | --- | --- | --- | --- |
|  | Composition | Number of parts | Composition | Molecular weight | Tg (° C.) | Number of parts | Type | Softening point (° C.) | Number of parts | Number of parts | ratio [Mass %] |
| Example 3 | 2EHA/NVP = 86/14 | 100 | CHMA/ IBMA = 60/40 | 4,000 | 59 | 12 | ARCON P100 | 100 | 8 | 0.15 | 71.1 |
| Example 4 | 2EHA/NVP = 86/14 | 100 | DCPMA | 4,600 | 175 | 12 | ARCON P125 | 125 | 8 | 0.1 | 63.4 |
| Comparative Example 1 | 2EHA/NVP = 86/14 | 100 | — | — | — | — | — | — | — | (HDDA) 0.04 | 77.4 |
| Comparative Example 2 | 2EHA/NVP = 86/14 | 100 | CHMA/ IBMA = 60/40 | 4,000 | 59 | 20 | — | — | — | 0.12 | 73.4 |
| Comparative Example 3 | 2EHA/NVP = 86/14 | 100 | — | — | — | — | ARCON P125 | 125 | 8 | 0.08 | 75.0 |
| Comparative Example 4 | 2EHA/NVP = 86/14 | 100 | BA | 5,000 | −50 | 12 | ARCON P125 | 125 | 8 | 0.15 | 71.8 |
| Comparative Example 5 | 2EHA/AA = 94/6 | 100 | DCPMA | 5,500 | 59 | 12 | ARCON P125 | 125 | 8 | 0.14 | 65.7 |
| Comparative Example 6 | 2EHA/NVP = 86/14 | 100 | CHMA/ IBMA = 60/40 | 4,000 | 59 | 12 | PINE CRYSTAL KE-311 | 80 | 8 | 0.25 | 66.9 |

The abbreviations in Table 2 indicate the following compounds.
2EHA: 2-ethylhexyl acrylate
NVP: N-vinyl-2-pyrrolidone
AA: acrylic acid
CHMA: cyclohexyl methacrylate
IBMA: isobutyl methacrylate
DCPMA: dicyclopentanyl methacrylate
DCPA: dicyclopentanyl acrylate
CHMA: cyclohexyl methacrylate
IBXA: isobornyl acrylate
TMPTA: trimethylolpropane triacrylate
HDDA: 1,6-hexanediol-diacrylate (Measurement of Solvent-Insoluble Component Ratio)

The solvent-insoluble component ratio was calculated by a solvent-insoluble component ratio calculation expression "solvent-insoluble component ratio (mass %)={(mass after immersing and drying)/(mass before immersing)}×100, after 0.1 g pressure-sensitive adhesive composition was sampled, precisely weighed (mass before immersing), and immersed at room temperature (20-25° C.) for 1 week in 50 mL ethyl acetate, a solvent (ethyl acetate)-insoluble portion was drawn out, and the solvent-insoluble portion was dried at 130° C. for 2 h and weighed (mass after immersing and drying).

(Preparation of Acrylic Polymer Syrup 1 (2EHA/NVP=86/14) as Component (A))

Into a four-necked flask, 86 parts by mass of 2-ethylhexyl acrylate (2EHA), 14 parts by mass of N-vinyl-2-pyrrolidone (NVP), 0.05 parts by mass of a photopolymerization initiator (trade name: IRGACURE 184, made by BASF Co.), and 0.05 parts by mass of another photopolymerization initiator (trade name: IRGACURE 651, made by BASF Co.) were charged. Next, this mixture was partially photopolymerized by exposing it to ultraviolet light in a nitrogen atmosphere, so that a partially polymerized product (acrylic polymer syrup 1) with a polymerization rate of about 11 mass % was obtained.

(Preparation of Acrylic Polymer Syrup 2 (2EHA/AA=94/6) as Component (A))

Into a four-necked flask, 94 parts by mass of 2-ethylhexyl acrylate (2EHA), 6 parts by mass of acrylic acid (AA), 0.05 parts by mass of a photopolymerization initiator (trade name: IRGACURE 184, made by BASF Co.), and 0.05 parts by mass of another photopolymerization initiator (trade name: IRGACURE 651, made by BASF Co.) were charged. Next, this mixture was partially photopolymerized by exposing it to ultraviolet light in a nitrogen atmosphere, so that a partially polymerized product (acrylic polymer syrup 2) with a polymerization rate of about 8 mass % was obtained.

(Preparation of (Meth)Acrylic Polymer 1 (CHMA/IBMA=60/40) as Component (B))

Cyclohexyl methacrylate (CHMA, 60 parts by mass), isobutyl methacrylate (IBMA, 40 parts by mass), thioglycolic acid (4.0 parts by mass) were mixed, and the dissolved oxygen was removed by blowing nitrogen gas. Next, after the temperature was raised to 90° C., PERHEXYL O (made by NOF CORPORATION, 0.005 parts by mass), and PERHEXYL D (made by NOF CORPORATION, 0.01 parts by mass) were mixed. After stirring this mixture at 90° C. for 1 h, the temperature was raised to 150° C. with spending 1 h, and the mixture was stirred at 150° C. for 1 h. Next, the temperature was raised to 170° C. with spending 1 h, and the mixture was stirred at 170° C. for 60 min.

Then, this mixture was decompressed at 170° C., and stirred for 1 h to remove the residual monomer, so that (meth) acrylic polymer 1 was obtained. The glass transition temperature (calculated by the Fox equation) of the (meth)acrylic polymer 1 obtained was 59° C., and its weight average molecular weight was 4,000.

(Preparation of (Meth)Acrylic Polymer 2 (DCPMA) as Component (B))

Into a four-necked flask, 100 parts by mass of toluene, 100 parts by mass of dicyclopentanyl methacrylate (DCPMA) (trade name: FA-513M, made by Hitachi Chemical Co., Ltd.), and 3 parts by mass of thioglycolic acid (GSH acid) as a chain transfer agent were charged. Next, this mixture was stirred at 70° C. for 1 h in a nitrogen atmosphere, and 0.2 parts by mass of azobisisobutyronitrile was charged as a thermal polymerization initiator into the flask, reacted at 70° C. for 2 h, and reacted at 80° C. for 2 h. Next, the reaction solution was charged in atmosphere at a temperature of 130° C., and the toluene, the chain transfer agent, and the unreacted monomer were removed by drying, so that solid (meth)acrylic polymer 2 was obtained. The glass transition temperature of the (meth)

acrylic polymer 2 obtained was 175° C., and its weight average molecular weight was 4,600.

(Preparation of (Meth)Acrylic Polymer 3 (BA) as Component (B))

Into a four-necked flask, 100 parts by mass of toluene, 100 parts by mass of butyl methacrylate (BA), and 3.0 parts by mass of thioglycolic acid (GSH acid) as a chain transfer agent were charged. Next, this mixture was stirred at 70° C. for 1 h in a nitrogen atmosphere, and 0.2 parts by mass of azobisisobutyronitrile was charged as a thermal polymerization initiator into the flask, reacted at 70° C. for 2 h, and reacted at 80° C. for 2 h. Next, the reaction solution was charged in atmosphere at a temperature of 130° C., and the toluene, the chain transfer agent, and the unreacted monomer were removed by drying, so that solid (meth)acrylic polymer 3 was obtained. The glass transition temperature of the (meth) acrylic polymer 3 obtained was –50° C., and its weight average molecular weight was 5,000.

Example 1

Preparation of Optical Acrylic Pressure-Sensitive Adhesive Composition

To 100 parts by mass of the aforementioned acrylic polymer syrup 1, 20 parts by mass of the aforementioned (meth) acrylic polymer 1, 5 parts by mass of ARCON P125 (hydrogenated petroleum-based resin, softening point: 125° C., made by Arakawa Chemical Industries, Ltd.), and 0.2 parts by mass of trimethylolpropane triacrylate were added and uniformly mixed, whereby an acrylic pressure-sensitive adhesive composition was prepared.

(Manufacture of Pressure-Sensitive Adhesive Layer Sheet)

On release-treated surface of a polyester film (trade name: MRF, made by Mitsubishi Chemical Polyester Co., Ltd.) with a thickness of 38 μm, whose one surface had been subjected to a release treatment by silicone, the aforementioned acrylic pressure-sensitive adhesive composition was coated to form a coated layer so that the final thickness became 50 μm. Next, another polyester film (trade name: MRN, made by Mitsubishi Chemical Polyester Co., Ltd.) with a thickness of 38 μm, whose one surface had been subjected to a release treatment by silicone, was laminated on the acrylic pressure-sensitive adhesive composition layer so that the release-treated surface of the film came into contact with the coated layer. Consequently, the coated layer (pressure-sensitive adhesive layer) of the optical acrylic pressure-sensitive adhesive composition was shielded from oxygen. Ultraviolet light with an illuminance of 5 mW/cm$^2$ (measured by a TOPCON UVR-T1 with a maximum sensitivity of about 350 nm) was irradiated for 360 sec onto the pressure-sensitive adhesive layer sheet obtained in this manner by using a black light lamp (made by Toshiba Corporation). The solvent-insoluble component ratio of the pressure-sensitive adhesive layer composed of the optical acrylic pressure-sensitive adhesive composition obtained in this manner was 71.3 mass %. The polyester films coated on both surfaces of the pressure-sensitive adhesive layer function as release liners.

Example 2

Except for adding 12 parts by mass of the aforementioned (meth)acrylic polymer 1, 8 parts by mass of ARCON P125 (hydrogenated petroleum-based resin, softening point: 125° C., made by Arakawa Chemical Industries, Ltd.), and 0.15 parts by mass of trimethylolpropane triacrylate to 100 parts by mass of the aforementioned acrylic polymer syrup 1, an acrylic pressure-sensitive adhesive composition and a pressure-sensitive adhesive layer sheet were obtained in a similar manner as Example 1. The solvent-insoluble component ratio of the pressure-sensitive adhesive layer obtained was 71.9 mass %.

Example 3

Except for adding 12 parts by mass of the aforementioned (meth)acrylic polymer 1, 8 parts by mass of ARCON P100 (hydrogenated petroleum-based resin, softening point: 100° C., made by Arakawa Chemical Industries, Ltd.), and 0.15 parts by mass of trimethylolpropane triacrylate to 100 parts by mass of the aforementioned acrylic polymer syrup 1, an acrylic pressure-sensitive adhesive composition and a pressure-sensitive adhesive layer sheet were obtained in a similar manner as Example 1. The solvent-insoluble component ratio of the pressure-sensitive adhesive layer obtained was 71.1 mass %.

Example 4

Except for adding 12 parts by mass of the aforementioned (meth)acrylic polymer 2, 8 parts by mass of ARCON P125 (hydrogenated petroleum-based resin, softening point: 125° C., made by Arakawa Chemical Industries, Ltd.), and 0.1 parts by mass of trimethylolpropane triacrylate to 100 parts by mass of the aforementioned acrylic polymer syrup 1, an acrylic pressure-sensitive adhesive composition and a pressure-sensitive adhesive layer sheet were obtained in a similar manner as Example 1. The solvent-insoluble component ratio of the pressure-sensitive adhesive layer obtained was 63.4 mass %.

Comparative Example 1

Except for adding 0.04 parts by mass of 1,6-hexanediol.diacrylate to 100 parts by mass of the aforementioned acrylic polymer syrup 1, an acrylic pressure-sensitive adhesive composition and a pressure-sensitive adhesive layer sheet were obtained in a similar manner as Example 1. The solvent-insoluble component ratio of the pressure-sensitive adhesive layer obtained was 77.4 mass %.

Comparative Example 2

Except for adding 20 parts by mass of the aforementioned (meth)acrylic polymer 1 and 0.12 parts by mass of trimethylolpropane triacrylate to 100 parts by mass of the aforementioned acrylic polymer syrup 1, an acrylic pressure-sensitive adhesive composition and a pressure-sensitive adhesive layer sheet were obtained in a similar manner as Example 1. The solvent-insoluble component ratio of the pressure-sensitive adhesive layer obtained was 73.4 mass %.

Comparative Example 3

Except for adding 8 parts by mass of ARCON P125 (hydrogenated petroleum-based resin, softening point: 125° C., made by Arakawa Chemical Industries, Ltd.) and 0.08 parts by mass of trimethylolpropane triacrylate to 100 parts by mass of the aforementioned acrylic polymer syrup 1, an acrylic pressure-sensitive adhesive composition and a pressure-sensitive adhesive layer sheet were obtained in a similar manner as Example 1. The solvent-insoluble component ratio of the pressure-sensitive adhesive layer obtained was 75.0 mass %.

Comparative Example 4

Except for adding 12 parts by mass of the aforementioned (meth)acrylic polymer 3, 8 parts by mass of ARCON P125 (hydrogenated petroleum-based resin, softening point: 125° C., made by Arakawa Chemical Industries, Ltd.), and 0.15 parts by mass of trimethylolpropane triacrylate to 100 parts by mass of the aforementioned acrylic polymer syrup 1, an acrylic pressure-sensitive adhesive composition and a pressure-sensitive adhesive layer sheet were obtained in a similar manner as Example 1. The solvent-insoluble component ratio of the pressure-sensitive adhesive layer obtained was 71.8 mass %.

Comparative Example 5

Except for adding 12 parts by mass of the aforementioned (meth)acrylic polymer 2, 8 parts by mass of ARCON P125 (hydrogenated petroleum-based resin, softening point: 125° C., made by Arakawa Chemical Industries, Ltd.), and 0.14 parts by mass of trimethylolpropane triacrylate to 100 parts by mass of the aforementioned acrylic polymer syrup 2, an acrylic pressure-sensitive adhesive composition and a pressure-sensitive adhesive layer sheet were obtained in a similar manner as Example 1. The solvent-insoluble component ratio of the pressure-sensitive adhesive layer obtained was 65.7 mass %.

Comparative Example 6

Except for adding 12 parts by mass of the aforementioned (meth)acrylic polymer 1, 8 parts by mass of PINE CRYSTAL KE-311 (hydrogenated rosin group resin, softening point: 80° C., made by Arakawa Chemical Industries, Ltd.), and 0.25 parts by mass of trimethylolpropane triacrylate to 100 parts by mass of the aforementioned acrylic polymer syrup 1, an acrylic pressure-sensitive adhesive composition and a pressure-sensitive adhesive layer sheet were obtained in a similar manner as Example 1. The solvent-insoluble component ratio of the pressure-sensitive adhesive layer obtained was 66.9 mass %.

(Testing Method)
Total Light Transmittance Test and Haze Test (Transparency Evaluation)

One release liner (polyester film) of the pressure-sensitive adhesive layer sheet of each example and each comparative example was peeled off, and its pressure-sensitive adhesive surface was pasted onto a slide glass (product No. S-1111: (Shiraryokuma) soda-lime glass ground edges, made by Matsunami Glass Ind., Ltd.) with a thickness of 0.8 mm. Next, the other release liner (polyester film) of the pressure-sensitive adhesive layer sheet was peeled off, and using a haze meter (made by Murakami Color Research Laboratory Co., Ltd.), the total light transmittance and the haze in the constitution in which the pressure-sensitive adhesive layer sheet and the slide glass were pasted together were measured. When the total light transmittance was 92.0% or more, it was evaluated as good (O), and when the total light transmittance was less than 92.0%, it was evaluated as poor (X). In addition, when the haze was less than 1.0, it was evaluated as good (O), and when the haze was 1.0 or greater, it was evaluated as poor (X). The measurement results are shown in Table 3.

180°-Peeling Adhesive Strength Test

One release liner (polyester film) of the pressure-sensitive adhesive layer sheet of each example and each comparative example was peeled off, and a polyethylene terephthalate film with a thickness of 50 μm was pasted onto it, followed by cutting into 25 mm in width, and adopted as a specimen. In addition, a plate was prepared in which a polarizing plate (SEG1425DV, made by Nitto Denko Corporation) with a low polarity surface was pasted onto an ABS (acrylonitrile-butadiene-styrene copolymer) plate with a thickness of 2 mm using a double-sided tape (No. 512, made by Nitto Denko Corporation). The other peel-off liner (polyester film) of the pressure-sensitive adhesive layer sheet was peeled off, and the pressure-sensitive adhesive surface of the pressure-sensitive adhesive layer sheet was pasted onto the polarizing film by reciprocation of a 2 kg roller.

The pressure-sensitive adhesive layer sheet was pasted onto the polarizing film and held for 30 min in a 23° C. environment. Next, the other end of the pressure-sensitive adhesive layer sheet was peeled off at a speed of 300 mm/min at 180° to the peeling direction, and the adhesive strength (resistance force) (unit: N/25 mm) with respect to an adherend at that time was measured. When the adhesive strength with respect to the polarizing film was 16 N/25 mm or higher, it was evaluated as good (O), and when the adhesive strength was lower than 16 N/25 mm, it was evaluated as poor (X). The measurement results are shown in Table 3.

TABLE 3

| | Haze (%) | Total light transmittance (%) | 180°-peeling adhesive strength (N/25 mm) |
|---|---|---|---|
| Example 1 | 0.5 (O) | 92.2 (O) | 29.8 (O) |
| Example 2 | 0.5 (O) | 92.0 (O) | 23.2 (O) |
| Example 3 | 0.5 (O) | 92.1 (O) | 23.1 (O) |
| Example 4 | 0.5 (O) | 92.1 (O) | 17.7 (O) |
| Comparative Example 1 | 0.3 (O) | 92.7 (O) | 8.9 (X) |
| Comparative Example 2 | 0.4 (O) | 92.3 (O) | 14.4 (X) |
| Comparative Example 3 | 1.0 (X) | 91.5 (X) | 10.4 (X) |
| Comparative Example 4 | 2.1 (X) | 90.9 (X) | 5.7 (X) |
| Comparative Example 5 | 1.1 (X) | 89.8 (X) | 5.0 (X) |
| Comparative Example 6 | 0.5 (O) | 92.5 (O) | 12.0 (X) |

As shown in Table 3, in Comparative Examples 1-6, at least one of the total light transmittance, haze and adhesive strength, was poor. On the contrary, in Examples 1-4, good results were obtained in all the properties. In other words, it was confirmed that each of these example exhibited high transparency and high adhesiveness.

While the invention has been described in detail and with reference to specific embodiments thereof, it will be apparent to one skilled in the art that various changes and modifications can be made therein without departing from the scope thereof.

This application is based on Japanese patent application No. 2011-009232 filed Jan. 19, 2011, the entire contents thereof being hereby incorporated by reference.

What is claimed is:

1. An optical acrylic pressure-sensitive adhesive composition, comprising:
   100 parts by mass of an acrylic polymer (A) which contains a vinylic monomer having a nitrogen atom in a skeleton thereof as a monomer unit and does not substantially contain a monomer containing a carboxyl group;
   1-70 parts by mass of a (meth)acrylic polymer (B) having a weight average molecular weight of 1,000 or greater and less than 30,000; and
   1-50 parts by mass of a hydrogenated tackifying resin (C), wherein the (meth)acrylic polymer (B) has a glass transition temperature of 0-300° C.

2. The optical acrylic pressure-sensitive adhesive composition according to claim 1, wherein the acrylic polymer (A) is a copolymer formed by copolymerizing, as essential components, the vinylic monomer and a (meth)acrylic acid ester represented by the following general formula (1):

$$CH_2=C(R^1)COOR^2 \quad (1)$$

wherein $R^1$ represents a hydrogen atom or a methyl group, and $R^2$ represents an alkyl group having 1-12 carbon atoms or an alicyclic hydrocarbon group.

3. The optical acrylic pressure-sensitive adhesive composition according to claim 1, wherein the vinylic monomer is one kind or two or more kinds of monomers selected from the group consisting of a N-vinyl cyclic amide represented by the following general formula (2):

$$CH_2=CHNCOR^3 \quad (2)$$

wherein $R^3$ represents a divalent organic group; and a (meth)acrylamide.

4. The optical acrylic pressure-sensitive adhesive composition according to claim 1, wherein the (meth)acrylic polymer (B) includes a (meth)acrylic monomer having an alicyclic structure as a monomer unit.

5. The optical acrylic pressure-sensitive adhesive composition according to claim 1, wherein the hydrogenated tackifying resin (C) is a petroleum-based resin or a terpene-based resin.

6. The optical acrylic pressure-sensitive adhesive composition according to claim 1, wherein the hydrogenated tackifying resin (C) has a softening point of 80-200° C.

7. An optical acrylic pressure-sensitive adhesive tape, which comprises a pressure-sensitive adhesive layer comprising an optical acrylic pressure-sensitive adhesive composition comprising:

100 parts by mass of an acrylic polymer (A) which contains a vinylic monomer having a nitrogen atom in a skeleton thereof as a monomer unit and does not substantially contain a monomer containing a carboxyl group;

1-70 parts by mass of a (meth)acrylic polymer (B) having a weight average molecular weight of 1,000 or greater and less than 30,000; and 1-50 parts by mass of a hydrogenated tackifying resin (C), wherein the (meth)acrylic polymer (B) has a glass transition temperature of 0-300° C.

* * * * *